Figure 7:
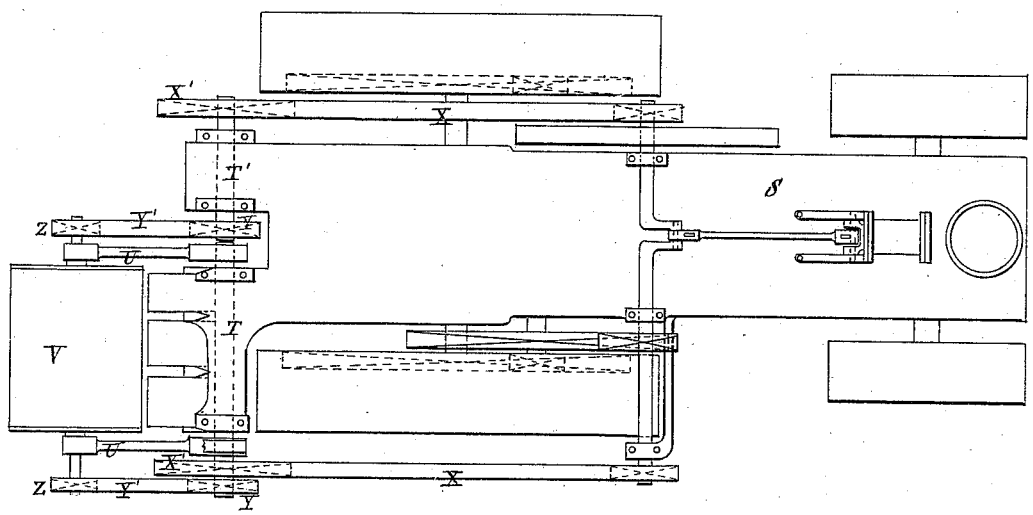

(No Model.) 3 Sheets—Sheet 1.
J. COOKE.
APPARATUS FOR CULTIVATING THE SOIL.
No. 309,337. Patented Dec. 16, 1884.
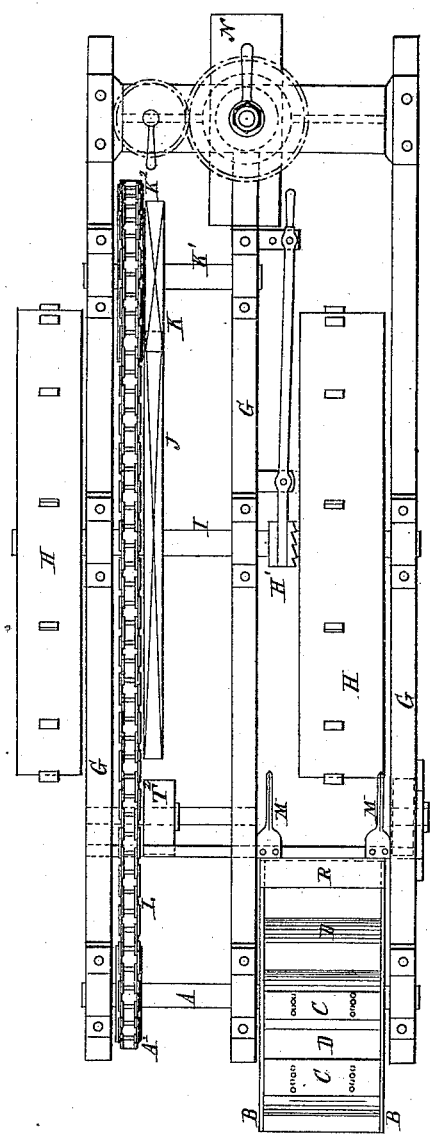
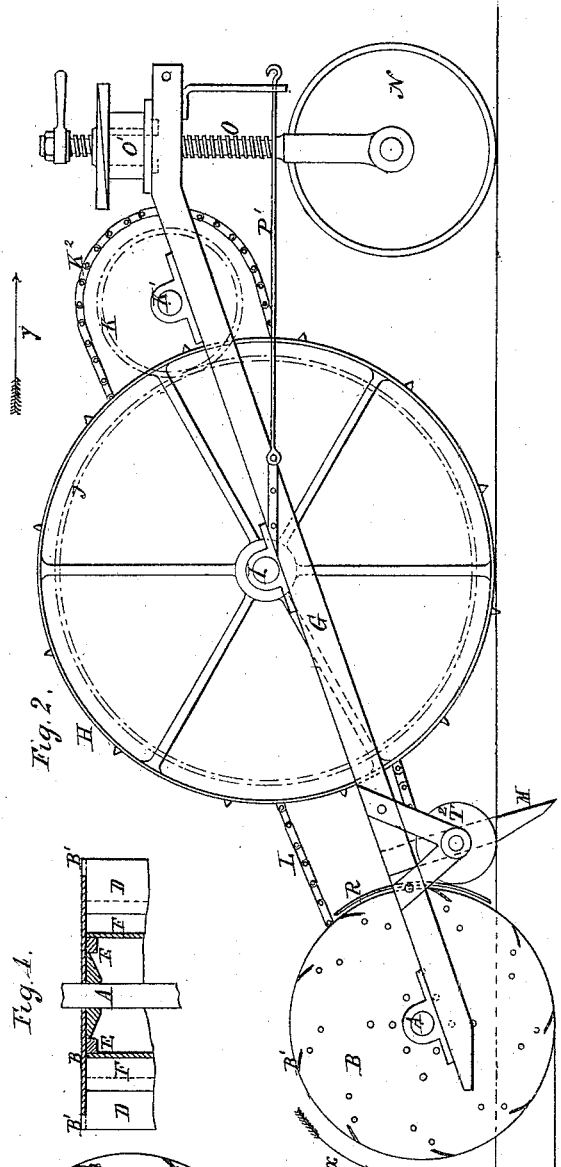
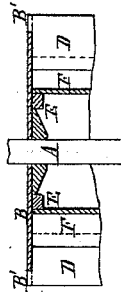
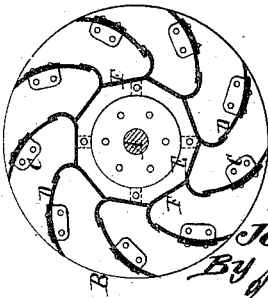
Witnesses.
Jo. L. Coombs
Robert Everett,
Inventor.
John Cooke.
By James L. Norris,
Atty.

(No Model.)  3 Sheets—Sheet 2.
J. COOKE.
APPARATUS FOR CULTIVATING THE SOIL.
No. 309,337.  Patented Dec. 16, 1884.
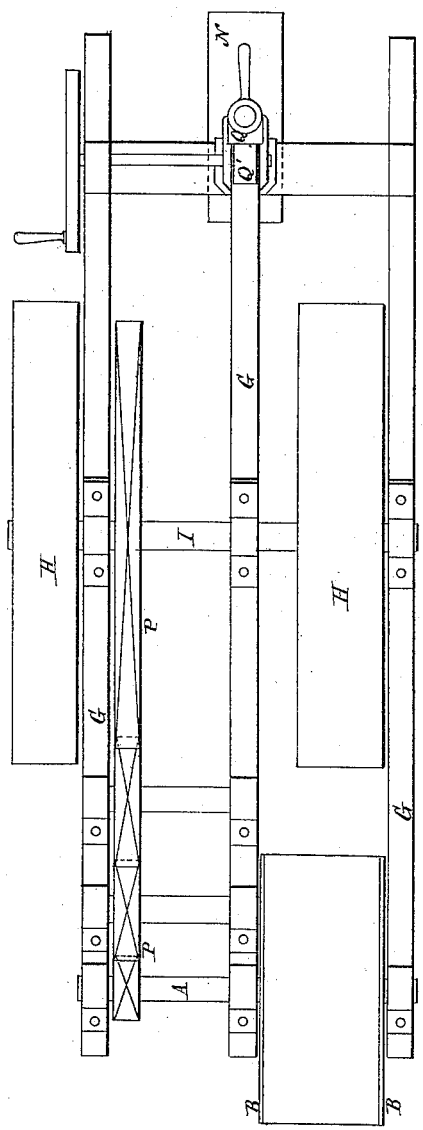
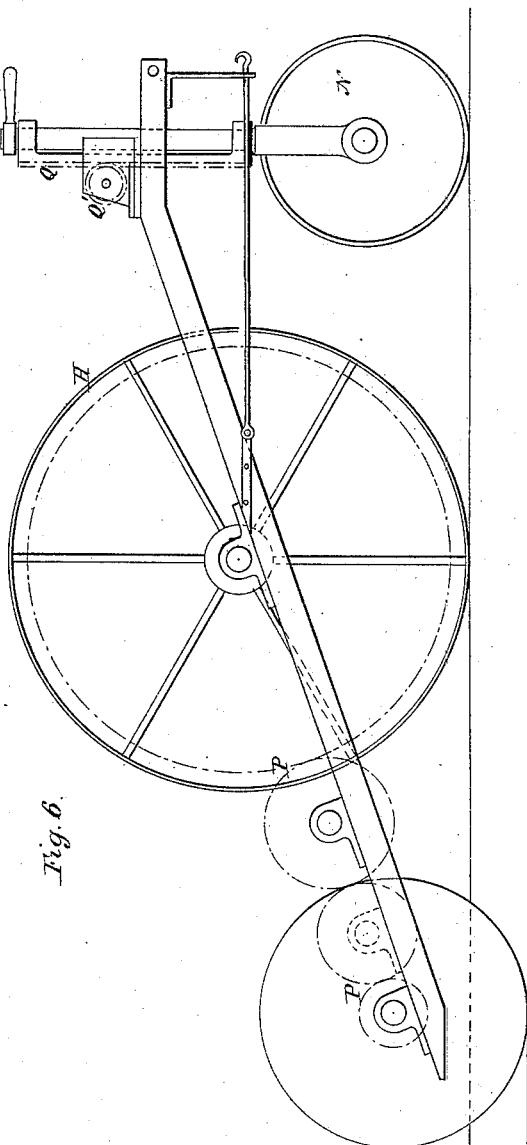
Witnesses,
Jo. L. Combs
Robert Everett
Inventor,
John Cooke.
By James L. Norris,
Atty.

(No Model.)  3 Sheets—Sheet 3.

J. COOKE.
APPARATUS FOR CULTIVATING THE SOIL.

No. 309,337. Patented Dec. 16, 1884.

Witnesses,
Jo. L. Coombs.
Robert Everett,

Inventor.
John Cooke.
By James L. Norris
Atty.

United States Patent Office.

JOHN COOKE, OF RICHMOND, COUNTY OF YORK, ENGLAND.

APPARATUS FOR CULTIVATING THE SOIL.

SPECIFICATION forming part of Letters Patent No. 309,337, dated December 16, 1884.

Application filed September 1, 1884. (No model.) Patented in England January 30, 1883, No. 498; in Canada February 16, 1884, No. 18,687, and in India March 3, 1884, No. 177.

*To all whom it may concern:*

Be it known that I, JOHN COOKE, a citizen of England, residing at Richmond, in the county of York, England, have invented an Improved Apparatus for Cultivating Soil, (for which I have obtained patents in Great Britain, dated 30th January, 1883, No. 498; Canada, dated 16th February, 1884, No. 18,687, and in India, dated 3d March, 1884, No. 177,) of which the following is a specification.

My invention relates to apparatus for cutting by continuous action a certain depth of soil, raising the soil displaced and tossing it down behind the apparatus, thereby effecting the disintegration and loosening required for cultivation. For this purpose, on a rapidly-revolving horizontal shaft I affix at intervals apart a number of cutting-disks, and between these disks I fix a number of cutting blades or prongs curved forward in the direction of revolution. The shaft revolves in bearings on a frame which can be raised or lowered, and which is mounted on a truck, so that it, with the cutting apparatus, can be moved across the field. The shaft of the cutting apparatus is connected to the wheels of the truck, or to the engine or other power that effects the traction, by gearing such that the cutters revolve rapidly in the direction opposite to that of the traveling wheels, so that they enter the soil in a forward direction, and effect their cut forward and upward, carrying up the separated soil and throwing it backward behind the cutting apparatus. In some cases I attach to the frame a presser, which travels along the surface of the soil immediately in front of the cutters, forming a moving abutment, against which they act in cutting the soil. The cutting apparatus may be attached to the rear part of a traction-engine, which carries it along the field and at the same time causes it to revolve; or it may be attached to a truck drawn by horses or oxen, or by a traction-rope worked by engine or other suitable power.

In order to avoid turning the machine round at the headlands, it may be made in duplicate, one cutting apparatus being mounted at one end of a swing-frame, and an oppositely-working apparatus being mounted at the opposite end of the frame, so that when one is depressed and acting on the soil in the one direction the other is elevated clear of the soil, but can in its turn be depressed and brought into action when the direction of travel is reversed.

Figure 1 of the accompanying drawings shows a plan, and Fig. 2 a side elevation, of apparatus according to my invention for disintegrating soil. Fig. 3 shows a section through the rotary cultivator on line X X, Fig. 1, and Fig. 4 shows a section through one of the side disks thereof.

On a shaft, A, are fixed two disks, B B, to which are attached, by means of transverse plates C C, a series of thin curved steel blades, D D. The disks B are notched at B', and into these notches fit projecting shoulders on the outer ends of the blades D, so that these are firmly supported by the disks. Centrally of the disks are wood bosses E, to which are screwed sheet-iron plates F, the ends of which are curved up, so as to overlap the inner ends of the blades D, so that the space between each two blades forms a closed scoop. The shaft of the rotary cultivator is mounted in bearings on a frame, G, supported by two wheels, H, that run on the soil, and are provided with spikes, as shown, to afford the necessary grip on the soil.

The shaft I of the wheels has a spur-wheel, J, gearing with a smaller wheel, K, on a shaft, K', which also carries a pitch-wheel, K². Round this pitch-wheel and round a second pitch-wheel A', on the shaft A, is led an endless pitch-chain, L, so that as the machine is drawn along in the direction of the arrow *y* the rotary cultivator is caused to rotate in the direction of the arrow *x*—that is to say, in the contrary direction to that in which it is moved along the ground—such rotation being considerably more rapid than the rate at which it is advanced over the soil. By this motion the curved blades D are made to cut in under the upper layer of soil, to raise portions of it and toss them over behind the apparatus as it travels along. In order to facilitate the cutting action of the blades, two or more colters, M, are fixed in front of the cultivator, so as to make longitudinal cuts in the soil where the disks B have to penetrate, and also, if necessary, at intermediate points between them. As the cutting-edges of the blades will wear away in course of time, it is preferred to make them with rows of rivet or bolt holes, as indicated at Fig. 1, so that when they become worn the rivets or bolts can be removed and the plates advanced to the next hole and fixed again. A curved guard-plate, R, is fixed to the framing on the front side of the cultivator, so as to prevent the soil taken up by the latter from being thrown in any other than a backward direction. The framing G is by preference arranged at an angle, as shown, the front end carrying the steering-wheel N, which is mounted on a screw, O, screwing through a nut, O', on the framing, so that when the cultivator has arrived at the headland it is raised from the ground by screwing downward the front end of the framing by means of the nut O'. The draw-bars P', to which the horses are connected, are by preference fixed to a point on the framing on a level with the axis of the wheels H. The one wheel H is by preference made loose on its axle, and is geared thereto by a clutch, H', which is thrown out of gear when the machine has to run in curves or to turn round. The two bearing-wheels $T^2$ regulate the depth cut by the cultivator and keep it to a uniform depth.

Figs. 5 and 6 show, respectively, a plan and side elevation of a modified construction in which the motion is imparted to the rotary cultivator by means of spur-gearing P P, instead of by a pitch-chain, and in which the axis of the steering-wheel N, instead of being formed with a screw-thread, has a toothed rack, Q, attached to it, in gear with which is a toothed pinion, Q', carried by the framing, so that by turning the pinion the front end of the framing is raised or lowered, so as to bring the rotary cultivator into or out of contact with the soil. The other parts are constructed in the same manner as above described.

In working the apparatus a plow-furrow is first made at each of the two headlands to enable the cultivator to be lowered to the requisite depth before traversing it.

Figure 8:
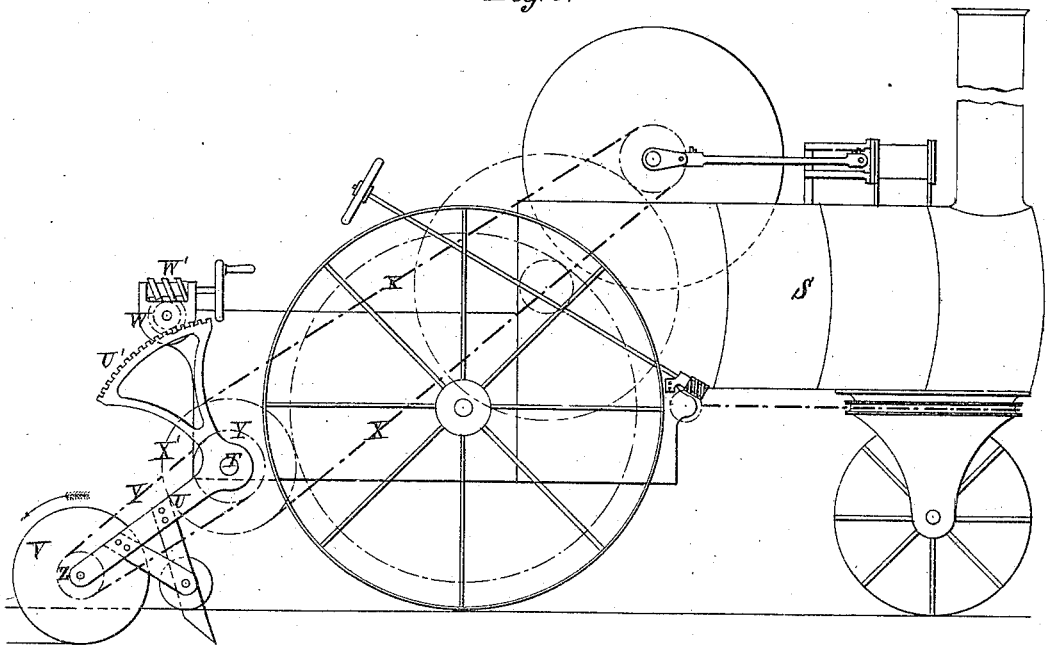

Figs. 7 and 8 show a plan and side view of an arrangement for propelling the cultivator by means of steam-power.

On the rear platform of the traction-engine S is mounted a shaft, T, on which are fixed two arms, U U, carrying at their ends the shaft of the cultivator V, and having a toothed quadrant, U', with which gears a pinion, W, carried by the framing of the engine, and that can be rotated by a worm, W', and crank-handle, so that by turning the pinion in one direction or the other the arms U are raised or lowered, so as to move the cultivator to or from the soil. The requisite rotary motion is imparted to the cultivator in the direction of the arrow by means of pitch-chains X X, imparting motion from the crank-shaft of the engine to pitch-wheels X' X', one of which runs loose on the shaft T, while the second is fixed on a second shaft, T'. These pitch-wheels impart motion to other pitch-wheels, Y Y, that impart a quick rotary motion to the cultivator by means of the pitch-chains Y' and pitch-wheels Z.

Obviously the cultivator may also be arranged to be propelled by stationary engines and traction-ropes, as in steam-plowing.

Having thus described the nature of my invention and the best means I know of carrying the same into practical effect, I claim—

1. In an apparatus for cultivating soil, the combination of the revolving cutting-disks and forwardly-curved cutting-blades secured thereto, substantially as described.

2. In an apparatus for cultivating soil, the combination of the revolving cutting-disks, the forwardly-curved cutting-blades secured thereto, and the plates F, curved to overlap the inner ends of the cutting-blades, substantially as and for the purpose described.

3. In an apparatus for cultivating soil, the combination, with the revolving cutting-disks and forwardly-curved cutting-blades secured thereto, of the guard-plate R, fixed to the framing of the apparatus in front of the cutting-blades, substantially as and for the purpose described.

4. In an apparatus for cultivating soil, the combination, with the revolving cutting-disks and forwardly-curved cutting-blades secured thereto, of two or more colters located in front of the cutting blades and disks, substantially as and for the purpose described.

In testimony whereof I have signed my name to this specification, in the presence of two subscribing witnesses, this 13th day of August, A. D. 1884.

JNO. COOKE.

Witnesses:
JNO. P. M. MILLARD,
HAROLD IMRAY.